United States Patent
Chen et al.

(10) Patent No.: US 9,432,950 B2
(45) Date of Patent: Aug. 30, 2016

(54) METHOD FOR TRANSMISSION POWER SHAPING AND COMMUNICATIONS APPARATUS UTILIZING THE SAME

(71) Applicant: MediaTek Inc., Hsin-Chu (TW)

(72) Inventors: Ju-Ya Chen, Kaohsiung (TW); Chia-Hao Yu, Yilan (TW); Yu-Chuan Lin, New Taipei (TW); Yi-Chun Wei, Hsinchu (TW); Yi-Jung Chiang, Kaohsiung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/199,032

(22) Filed: Mar. 6, 2014

(65) Prior Publication Data

US 2015/0257110 A1 Sep. 10, 2015

(51) Int. Cl.
| | |
|---|---|
| *H04L 27/00* | (2006.01) |
| *H04W 52/24* | (2009.01) |
| *H04W 52/14* | (2009.01) |
| *H04W 52/32* | (2009.01) |
| *H04W 52/34* | (2009.01) |
| *H04W 52/58* | (2009.01) |

(52) U.S. Cl.
CPC ......... *H04W 52/241* (2013.01); *H04W 52/146* (2013.01); *H04W 52/325* (2013.01); *H04W 52/34* (2013.01); *H04W 52/247* (2013.01); *H04W 52/58* (2013.01); *Y02B 60/50* (2013.01)

(58) Field of Classification Search
CPC .............................................. H04B 2001/0416
USPC ........................................................ 375/259
See application file for complete search history.

(56) References Cited

U.S. PATENT DOCUMENTS

| | | | | |
|---|---|---|---|---|
| 5,909,643 | A * | 6/1999 | Aihara ...................... 455/127.3 |
| 2008/0069062 | A1* | 3/2008 | Li et al. ........................ 370/338 |
| 2009/0248303 | A1* | 10/2009 | Tai ................................ 701/214 |
| 2011/0280289 | A1* | 11/2011 | Buer et al. ..................... 375/219 |
| 2012/0099512 | A1* | 4/2012 | Yamazaki ..................... 370/312 |
| 2012/0108224 | A1* | 5/2012 | Cheng et al. ................. 455/418 |
| 2012/0213172 | A1* | 8/2012 | Kim et al. ..................... 370/329 |
| 2013/0084818 | A1* | 4/2013 | Croman et al. ............ 455/226.1 |

* cited by examiner

*Primary Examiner* — Santiago Garcia
(74) *Attorney, Agent, or Firm* — McClure, Qualey & Rodack, LLP

(57) ABSTRACT

A communications apparatus. The RF signal processing device is capable of supporting carrier aggregation and configured to process RF signals. The baseband signal processing device is configured to process baseband signals. The processor is configured to control operations of the RF signal processing device and the baseband signal processing device. The processor further receives a power control signal from a peer communications apparatus, obtains an assigned transmission power which is assigned by the peer communications apparatus for the communications apparatus to transmit a reference signal according to information carried in the power control signal, determines a spectral efficiency estimation value of the communications apparatus and directs the RF signal processing device to transmit the reference signal with a reduced transmission power which is smaller than the assigned transmission power when the spectral efficiency estimation value is smaller than a predetermined threshold.

18 Claims, 3 Drawing Sheets

METHOD FOR TRANSMISSION POWER SHAPING AND COMMUNICATIONS APPARATUS UTILIZING THE SAME

BACKGROUND OF THE INVENTION

1. Field of the Invention

The invention relates to a method for transmission power shaping, and more particularly to a method for transmission power shaping in carrier aggregation (CA).

2. Description of the Related Art

Electronic devices (such as cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

These electronic devices may communicate wirelessly with each other and with a network. As the demand for information by these electronic devices has increased, the throughput has also increased. One way to increase throughput is the use of carrier aggregation (CA). In carrier aggregation, multiple carriers may be aggregated on the physical layer to provide the required bandwidth (and thus the required throughput).

It may be desirable for an electronic device to maximize battery life. Because an electronic device often runs on a battery with a limited operation time, reductions in the power consumption of an electronic device may increase the desirability and functionality of the electronic device.

BRIEF SUMMARY OF THE INVENTION

Communications apparatuses and methods for transmission power shaping of a communications apparatus supporting carrier aggregation are provided. An exemplary embodiment of a communications apparatus comprises an RF signal processing device, at least a baseband signal processing device, and a processor. The RF signal processing device is capable of supporting carrier aggregation and configured to process RF signals. The baseband signal processing device is configured to process baseband signals. The processor is configured to control operations of the RF signal processing device and the baseband signal processing device. The processor further receives a power control signal from a peer communications apparatus, obtains an assigned transmission power which is assigned by the peer communications apparatus for the communications apparatus to transmit a reference signal according to information carried in the power control signal, determines a spectral efficiency estimation value of the communications apparatus and directs the RF signal processing device to transmit the reference signal with a reduced transmission power which is smaller than the assigned transmission power when the spectral efficiency estimation value is smaller than a predetermined threshold.

An exemplary embodiment of a method for transmission power shaping of a communications apparatus supporting carrier aggregation comprises: receiving a power control signal from a peer communications apparatus; obtaining an assigned transmission power which is assigned by the peer communications apparatus for the communications apparatus to transmit a reference signal according to information carried in the power control signal; determining a spectral efficiency estimation value of the communications apparatus; and transmitting the reference signal with a reduced transmission power which is smaller than the assigned transmission power when the spectral efficiency estimation value is smaller than a predetermined threshold.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
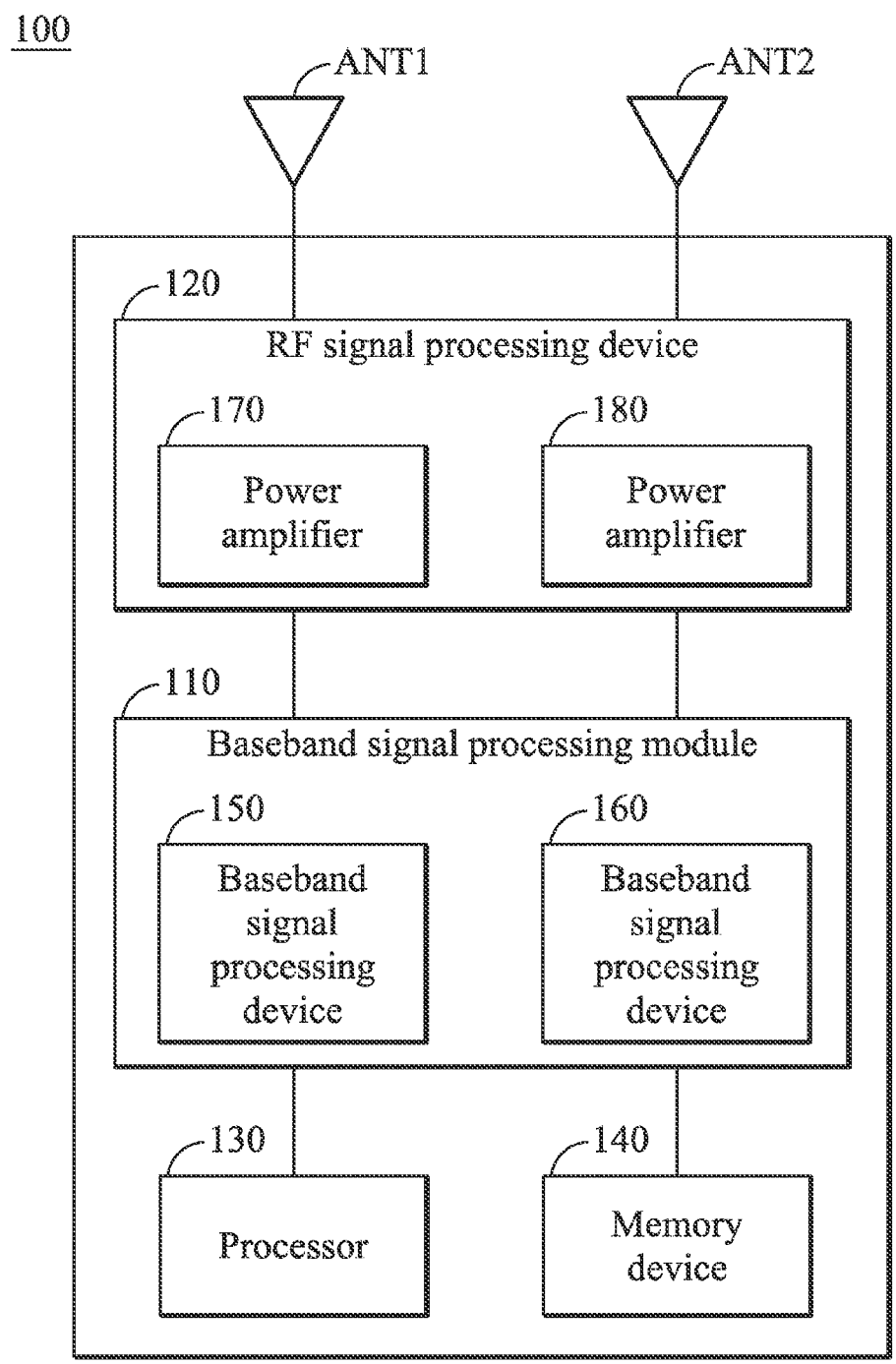
FIG. 1 is an exemplary block diagram of a communications apparatus according to an embodiment of the invention.

FIG. 1 is an exemplary block diagram of a communications apparatus according to an embodiment of the invention. The communications apparatus 100 may comprise one or more antennas, such as the antennas ANT1 and ANT2 as shown, for transmitting and receiving radio frequency (RF) signals to and from an air interface, an RF signal processing device 120, a baseband signal processing module 110, a memory device 140 and a processor 130. The RF signal processing device 120 may be a Carrier Aggregation (CA) RF signal processing device that is capable of supporting the processing, transmitting and receiving of RF signals on multiple frequency bands. The baseband signal processing module 110 may comprise one or more baseband signal processing devices, such as the baseband signal processing devices 150 and 160, for supporting CA and processing the baseband signals transmitted by different carriers on multiple frequency bands.

The RF signal processing device 120 is configured to receive RF signals from the air interface via one or more antennas, and process the received RF signals to convert the received RF signals to baseband signals to be processed by the baseband signal processing device 150 or 160. The RF signal processing device 120 is further configured to receive baseband signals from the baseband signal processing devices 150 and 160, convert the received baseband signals to RF signals, and transmit the RF signals to a peer communication apparatus, such as a base station or an evolved node-B (eNB). The RF signal processing device 120 may comprise a plurality of hardware elements. For example, one or more power amplifiers, such as the power amplifiers 170 and 180, one or more mixers (not shown), one or more filters (not shown), or others.

The baseband signal processing devices 150 and 160 further process the baseband signals to convert the baseband signals to a plurality of digital signals, and process the digital signals, and vice versa. The baseband signal processing devices 150 and 160 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The memory device 140 may store program codes, system data and user data. The processor 130 may control the operations of the baseband signal processing devices 150 and 160 and the RF signal processing device 120. According to an embodiment of the invention, the processor 130 may also be configured to execute the program codes of the software module(s) of the corresponding baseband signal processing device and/or the RF signal processing device. The program codes accompanied with specific data in a data structure may also be referred to as a processor logic unit or a stack instance when being executed. Therefore, the processor may be regarded as comprising a plurality of processor logic units, each for executing one or more specific functions or tasks of the corresponding software module(s).

Note that, in some embodiments of the invention, the processor may also be configured inside of the baseband signal processing module 110, or the communications apparatus 100 may comprise another processor configured inside of the baseband signal processing module 110. Thus the invention should not be limited to the architecture as shown in FIG. 1. In addition, note that, in order to clarify the concept of the invention, FIG. 1 presents a simplified block diagram, in which only the elements relevant to the invention are shown. However, the invention should not be limited to what is shown in FIG. 1.

Note further that in some embodiments of the invention, the communications apparatus 100 may also comprise one antenna (as long as the antenna can support multi-band transceiving) or more than two antennas, and the baseband signal processing module 110 may also comprise one (as long as the baseband signal processing device can support CA) or more than two baseband signal processing devices. Therefore, FIG. 1 merely shows an exemplary block diagram of the proposed communications apparatus, and the invention should not be limited to what is shown in FIG. 1.

Generally, carrier aggregation (CA) can be applied in both the uplink transmission and downlink transmission of the communications apparatus 100. For the uplink transmission, the communications apparatus 100 is configured to transmit signal and data to a peer communications apparatus at the network side, such as the base station or the eNB as discussed above. For the downlink transmission, the communications apparatus 100 is configured to receive signal and data from the peer communications apparatus. The communications apparatus 100 may report the channel state information (CSI) for providing the downlink channel information to the network, and may transmit a reference signal to the network for uplink channel sounding. The peer communications apparatus in the network may perform carrier selection based on the received CSI report and the reference signal. However, both the uplink and downlink scheduling is the responsibility of the network, and the communications apparatus 100 has no right to actively select a preferred carrier. This becomes a problem when the peer communications apparatus keep scheduling uplink data on a carrier with a bad channel condition, causing the uplink performance to be downgraded. This is even worse when the communications apparatus 100 has to use more and more transmission power to transmit uplink data on a carrier with a bad channel condition. Therefore, methods for transmission power shaping of a communications apparatus supporting carrier aggregation are proposed. With the proposed methods for transmission power shaping, both the uplink transmission performance and power consumption of the communications apparatus 100 can be improved.

According to an embodiment of the invention, after receiving a power control signal from a peer communications apparatus (e.g. an eNB, hereinafter using the eNB as an example) in the network, the processor 130 may obtain an assigned transmission power which is assigned by the eNB for the communications apparatus 100 to transmit a reference signal according to information carried in the power control signal. According to an embodiment of the invention, the reference signal is transmitted by the communications apparatus 100 for the eNB to perform channel estimation and uplink carrier selection. For example, the reference signal may be the sounding reference signal (SRS).

Next, the processor 130 may determine a spectral efficiency estimation value of the communications apparatus 100, and determine whether the spectral efficiency estimation value is smaller than a predetermined threshold. According to an embodiment of the invention, the spectral efficiency estimation value may be determined based on a transmission throughput of the communications apparatus 100. For example, the spectral efficiency estimation value may be determined based on an expected transport block size (TBS), a modulation and coding scheme (MCS), a physical resource block size, or others. According to another embodiment of the invention, the spectral efficiency estimation value may be determined based on observed transmission power per bit. The observed transmission power per bit may be a ratio of an observed transmission power to the throughput per transmission. According to yet another embodiment of the invention, the spectral efficiency estimation value may be determined based on an estimated channel power gain. According to still another embodiment of the invention, the spectral efficiency estimation value may be determined based on a signal to noise plus interference ratio.

Next, the processor 130 may direct the RF signal processing device 120 to transmit the reference signal with reduced transmission power, which is smaller than the assigned transmission power when the spectral efficiency estimation value is smaller than a predetermined threshold.

For example, in one embodiment of the invention, the spectral efficiency estimation value may be determined based on the observed transmission power per bit as calculated below:

$$\mu_i = E\left[\frac{P_{TX}}{TP}\right] \quad \text{Eq. (1)}$$

where i is the index of the $i^{th}$ component carrier (CC) $CC_i$, $P_{TX}$ is the observed transmission power, and the TP is the throughput per transmission.

Note that since the spectral efficiency decreases as the transmission power per bit increases, the spectral efficiency estimation value is inversely proportional to the observed transmission power per bit. Suppose that the assigned transmission power assigned by the eNB for the $i^{th}$ component carrier $CC_i$ is $P_{assigned,i}$, the reduced transmission power for the $i^{th}$ component carrier $CC_i$ is $P_{reduced,i}$ and the predetermined threshold for the observed transmission power per bit is $\mu_{threshold}$, the processor 130 may determine whether to use the assigned transmission power or the reduced transmission power for transmitting the reference signal on the $i^{th}$ component carrier $CC_i$ as calculated below:

$$P_i = \begin{cases} P_{assigned,i}, & \mu_i \leq \mu_{threshold} \\ P_{reduced,i}, & \mu_i > \mu_{threshold} \end{cases} \qquad \text{Eq. (2)}$$

Note that since the spectral efficiency estimation value is inversely proportional to the observed transmission power per bit, the processor 130 may determine to use the reduced transmission power for transmitting the reference signal on the $i^{th}$ component carrier $CC_i$ when the observed transmission power per bit $\mu_i$ is greater than the predetermined threshold for the observed transmission power per bit $\mu_{threshold}$. As an example, the predetermined threshold $\mu_{threshold}$ may be determined based on system requirement and the reduced transmission power for the $i^{th}$ component carrier $CC_i$ is $P_{reduced,i}$ may be zero.

In another embodiment of the invention, when there are two CCs, Eq. (2) may be changed as shown below:

$$P_1 = \begin{cases} P_{assigned,1}, & \mu_1 \leq \alpha_1 * \mu_2 \\ P_{reduced,1}, & \mu_1 > \alpha_1 * \mu_2 \end{cases} \qquad \text{Eq. (3)}$$

$$P_2 = \begin{cases} P_{assigned,2}, & \mu_2 \leq \alpha_2 * \mu_1 \\ P_{reduced,2}, & \mu_2 > \alpha_2 * \mu_1 \end{cases} \qquad \text{Eq. (4)}$$

where $0 < \alpha_1 \leq 1$ and $0 < \alpha_2 \leq 1$.

In another embodiment of the invention, the spectral efficiency estimation value may be determined based on an estimated channel power gain. According to the embodiments of the invention, the estimated channel power gain may be obtained according to the channel impulse response, the signal to noise ratio, the signal to noise plus interference ratio, or others. Suppose that the estimated channel power gain for the $i^{th}$ component carrier $CC_i$ is $g_i$, and the predetermined threshold for the estimated channel power gain is $g_{threshold}$, the processor 130 may determine whether to use the assigned transmission power or the reduced transmission power for transmitting the reference signal on the $i^{th}$ component carrier $CC_i$ as below:

$$P_i = \begin{cases} P_{assigned,i}, & g_i \geq g_{threshold} \\ P_{reduced,i}, & g_i < g_{threshold} \end{cases} \qquad \text{Eq. (5)}$$

Note that since the spectral efficiency decreases as the channel power gain decreases, the spectral efficiency estimation value is proportional to the estimated channel power gain.

According to an embodiment of the invention, the RF signal processing device 120 may transmit the reference signal with the reduced transmission power in a physical uplink shared channel (PUSCH) and transmit the reference signal with the assigned transmission power in a physical uplink control channel (PUCCH). Since the important control signals are transmitted in the PUCCH, it is preferable for the communications apparatus 100 to transmit the reference signal with the assigned transmission power in the PUCCH.

Figure 2:
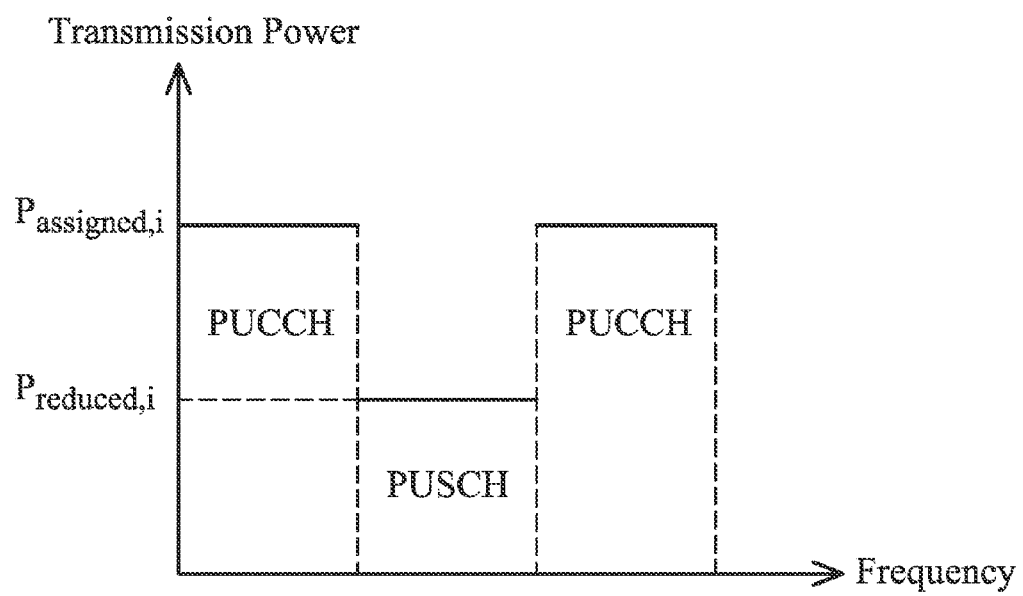
FIG. 2 shows an exemplary power spectrum of the $i^{th}$ component carrier $CC_i$ according to an embodiment of the invention.

FIG. 2 shows an exemplary power spectrum of the $i^{th}$ component carrier $CC_i$ according to an embodiment of the invention, where the X axis represents frequency and the Y axis represents transmission power of the reference signal. As shown in FIG. 2, the reference signal is transmitted with the assigned transmission power $P_{assigned,i}$ in PUCCH and transmitted with the reduced transmission power $P_{reduced,i}$ in PUSCH. In this manner, the transmission power is shaped as shown in FIG. 2.

Once the eNB receives the reference signal with reduced power which is lower than the assigned transmission power determined based on its power control rule, the eNB may regard the uplink channel as poor and may trigger a handover procedure to select another carrier or trigger a removal procedure to remove the $i^{th}$ component carrier $CC_i$ from the CA. When the amount of CCs is reduced (for example, when $CC_i$ is removed), one or more of the power amplifiers in the RF signal processing device 120 can be turned off. Therefore, the power consumption of the communications apparatus 100 can be reduced.

Figure 3:
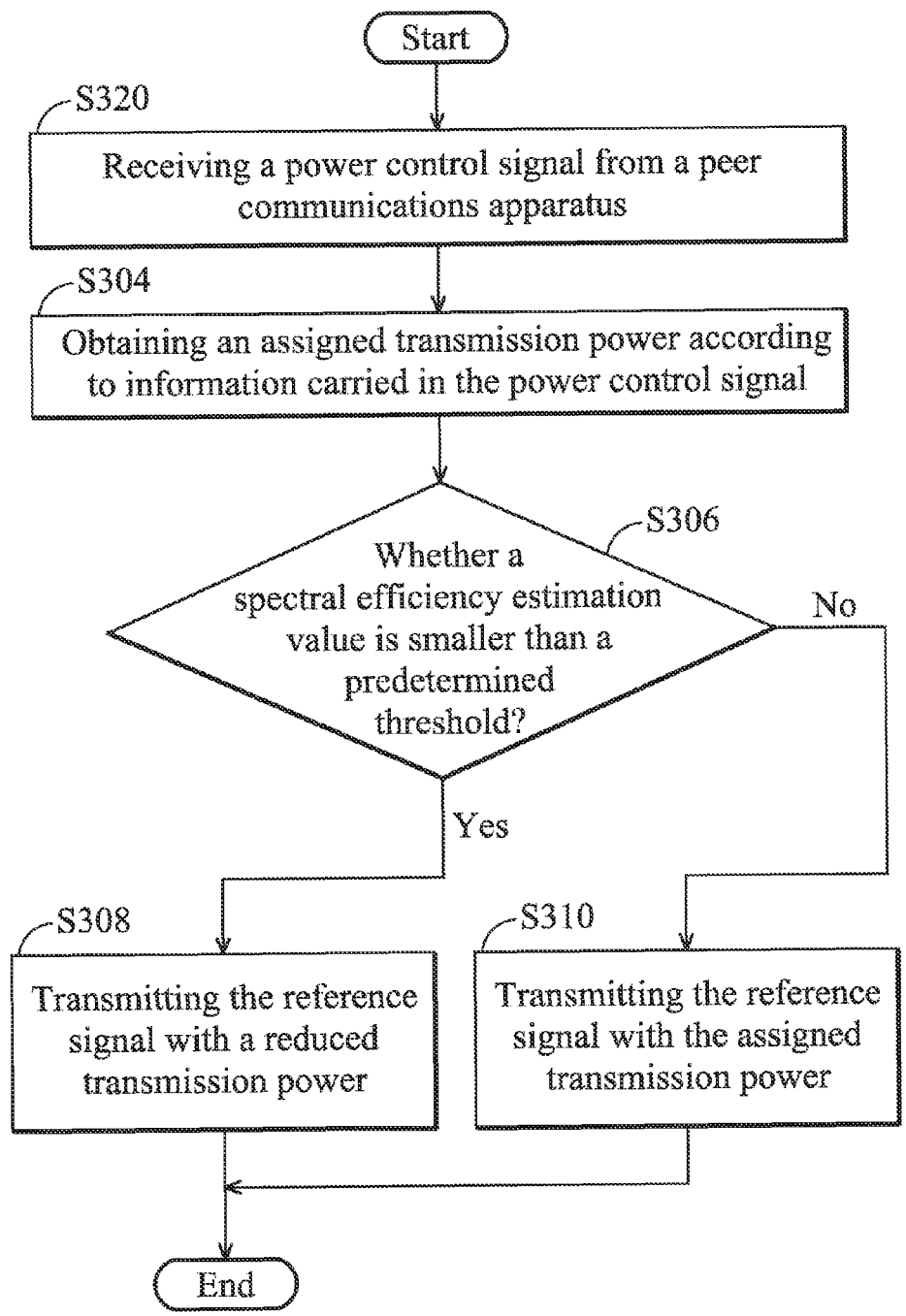
FIG. 3 shows a flow chart of a method for transmission power shaping in CA according to an embodiment of the invention.

FIG. 3 shows a flow chart of a method for transmission power shaping in CA according to an embodiment of the invention. First of all, the communications apparatus 100 may receive a power control signal from a peer communications apparatus (Step S302). Next, the communications apparatus 100 may obtain an assigned transmission power which is assigned by the peer communications apparatus for the communications apparatus to transmit a reference signal according to information carried in the power control signal (Step S304). Next, the communications apparatus 100 may determine a spectral efficiency estimation value and determine whether the spectral efficiency estimation value is smaller than a predetermined threshold (Step S306). If so, the communications apparatus 100 may transmit the reference signal with a reduced transmission power which is smaller than the assigned transmission power (Step S308). If not, the communications apparatus 100 may transmit the reference signal with the assigned transmission power (Step S310).

As previously described, with the proposed methods for transmission power shaping, a subsequent handover procedure or CC removal procedure may be triggered. The communications apparatus 100 may apply the proposed methods for transmission power shaping when the communications apparatus 100 determines that the uplink transmission performance is not good enough, the uplink power consumption is huge or when the communications apparatus 100 wants to save more battery power. Once the communications apparatus 100 applies the proposed methods for transmission power shaping, both the uplink transmission performance and power consumption of the communications apparatus 100 can be improved.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
   an RF signal processing device, capable of supporting carrier aggregation and configured to process RF signals;
   at least a baseband signal processing device, configured to process baseband signals; and a processor, configured to control operations of the RF signal processing device and the baseband signal processing device, wherein the processor further receives a power control signal from a peer communications apparatus, obtains an assigned transmission power which is assigned by the peer communications apparatus for the communications apparatus to transmit a reference signal for uplink carrier selection according to information carried in the power control signal, determines a spectral efficiency estimation value of the communications apparatus and directs the RF signal processing device to transmit the reference signal with a reduced transmission power or the assigned transmission power according to the determined spectral efficiency estimation value;

wherein the reference signal is transmitted with the reduced transmission power in a physical uplink shared channel (PUSCH).

2. The communications apparatus as claimed in claim 1, wherein the reference signal is a sounding reference signal.

3. The communications apparatus as claimed in claim 1, wherein the spectral efficiency estimation value is determined based on transmission throughput.

4. The communications apparatus as claimed in claim 1, wherein the spectral efficiency estimation value is determined based on observed transmission power per bit.

5. The communications apparatus as claimed in claim 1, wherein the spectral efficiency estimation value is determined based on an estimated channel power gain.

6. The communications apparatus as claimed in claim 1, wherein the spectral efficiency estimation value is determined based on a signal to noise plus interference ratio.

7. The communications apparatus as claimed in claim 1, wherein the RF signal processing device further comprises a plurality of power amplifiers, and wherein one of the power amplifiers is turned off after transmitting the reference signal with the reduced transmission power.

8. A method for transmission power shaping of a communications apparatus supporting carrier aggregation, comprising:
receiving a power control signal from a peer communications apparatus;
obtaining an assigned transmission power which is assigned by the peer communications apparatus for the communications apparatus to transmit a reference signal for uplink carrier selection according to information carried in the power control signal;
determining a spectral efficiency estimation value of the communications apparatus; and
transmitting the reference signal with a reduced transmission power or the assigned transmission power according to the determined spectral efficiency estimation value, wherein the reference signal is transmitted with the reduced transmission power in a physical uplink shared channel (PUSCH).

9. The method as claimed in claim 8, wherein the reference signal is a sounding reference signal.

10. The method as claimed in claim 8, wherein the spectral efficiency estimation value is determined based on a transmission throughput.

11. The method as claimed in claim 8, wherein the spectral efficiency estimation value is determined based on observed transmission power per bit.

12. The method as claimed in claim 8, wherein the spectral efficiency estimation value is determined based on an estimated channel power gain.

13. The method as claimed in claim 8, wherein the spectral efficiency estimation value is determined based on a signal to noise plus interference ratio.

14. The method as claimed in claim 8, further comprising:
turning off one of a plurality of power amplifiers of the communications apparatus after transmitting the reference signal with the reduced transmission power.

15. The communications apparatus as claimed in claim 1, wherein the RF signal processing device transmits the reference signal with the reduced transmission power when the spectral efficiency estimation value is smaller than a predetermined threshold.

16. The method as claimed in claim 8, wherein the reference signal with the reduced transmission power is transmitted when the spectral efficiency estimation value is smaller than a predetermined threshold.

17. The communications apparatus as claimed in claim 1, wherein the RF signal processing device further transmits the reference signal with the assigned transmission power in a physical uplink control channel (PUCCH).

18. The method as claimed in claim 8, further comprising:
transmitting the reference signal with the assigned transmission power in a physical uplink control channel (PUCCH).

* * * * *